(12) United States Patent
Chang et al.

(10) Patent No.: US 8,477,842 B2
(45) Date of Patent: Jul. 2, 2013

(54) ENCODING METHOD OF SCREEN FRAME AND ELECTRONIC DEVICE APPLYING THE SAME

(75) Inventors: Kuo-Lung Chang, Junghe (TW); Hsing-Yung Wang, Junghe (TW); Meng-Chung Hung, Junghe (TW); Way Lu-Chen, Junghe (TW)

(73) Assignee: Awind, Inc., Taipei County (TW)

( * ) Notice: Subject to any disclaimer, the term of this patent is extended or adjusted under 35 U.S.C. 154(b) by 333 days.

(21) Appl. No.: 12/791,400

(22) Filed: Jun. 1, 2010

(65) Prior Publication Data

US 2011/0103465 A1        May 5, 2011

(30) Foreign Application Priority Data

Oct. 30, 2009   (TW) ................................ 98136882 A

(51) Int. Cl.
*H04B 1/66*        (2006.01)
(52) U.S. Cl.
USPC ............ 375/240.02; 375/240.16; 375/240.15; 375/240.14; 375/240.12; 375/240.24; 375/240.08; 382/239; 382/243; 382/244; 382/236; 382/238
(58) Field of Classification Search
USPC ............ 375/240.02, 240.16, 240.15, 240.14, 375/240.12, 240.24, 240.08; 382/239, 243, 382/244, 236, 238
See application file for complete search history.

(56) References Cited

U.S. PATENT DOCUMENTS

| | | | | |
|---|---|---|---|---|
| 6,654,483 | B1 * | 11/2003 | Bradski | 382/107 |
| 7,506,071 | B2 * | 3/2009 | Ayres et al. | 709/247 |
| 7,856,055 | B2 * | 12/2010 | Zhou et al. | 375/240.12 |
| 2010/0135397 | A1 * | 6/2010 | Tanaka | 375/240.16 |

* cited by examiner

*Primary Examiner* — Shawn An
(74) *Attorney, Agent, or Firm* — Muncy, Geissler, Olds & Lowe, PLLC

(57) ABSTRACT

An encoding method of screen frame and its application of electronic devices, which rapidly detect motion regions and motionless regions from lossless screen frames captured by software, and then encode the motion regions with lower image quality while encode motionless regions with higher quality to display higher quality images and smooth video at a receiving end in real-time. Furthermore, the above-mentioned encoding method is optimized for lossless screen frames which does not need complicated operations of video encoder of prior art, such as motion estimation, motion compensation, etc., so that the method can be implemented with minor system resources and lower latency delay.

20 Claims, 4 Drawing Sheets

ENCODING METHOD OF SCREEN FRAME AND ELECTRONIC DEVICE APPLYING THE SAME

BACKGROUND OF THE INVENTION

1. Field of the Invention

The present invention is related to an encoding method of the screen frame and the electronic device applying the same, and more particularly to an encoding method of the screen frame adaptively changing the image quality and the electronic device applying the same.

2. Description of the Prior Art

Screen frame sharing is an important application of information technology. Examples of screen frame sharing include performing remote control with remote desktop, or wirelessly transmitting presentation slides from a computer to a projector. Typically, screen frame data, obtained by the operating system through a software program, is lossless. However, due to limited communication bandwidth, the screen frame data has to be compressed through encoding before being transmitted.

Since any loss of the image quality of the screen frame, being full of regular patterns such as rectangular frames, curves or fonts, is easily observed by a user, the requirement of the image quality of the decoded and recovered screen frame is high. Besides, as the user is primarily involved in other jobs such as remote control or presentation, the screen encoder should not occupy too many system resources so that the primary job can be run without being affected. Moreover, the shorter the latency from the screen frame being transmitted by the transmitting end to the screen frame being displayed by the receiving end, the closer the feeling of real time control of the remote user.

However, when the prior art screen encoder processes screen frames including a video region with lossless or lower loss encoding, the amount of data may exceed the capacity of network or the receiving system, causing the video to appear discontinuous due to insufficient frame rate on the receiving end. On the contrary, when the prior art screen encoder compresses the data with higher loss encoding, even the motionless region of the screen frame would have a higher loss image quality. Besides, when processed by the prior art video encoder, the regular patterns of the screen frame also has the lossy problem. In addition, the complicated algorithms adopted by the prior art video encoder, such as motion estimation and motion compensation, etc., would occupy too many system resources and incur longer latency.

Therefore, it is highly desirable that a screen frame encoding method not only utilizes less system resources, but also presents a smooth video and a higher quality motionless image simultaneously with lower latency for screen frame sharing.

SUMMARY OF THE INVENTION

The present invention is directed to an encoding method of screen frame and an electronic device applying the same which adaptively changes the image quality so that a smooth video and a higher quality motionless image can be presented simultaneously with shorter latency for screen sharing, while less system resources would be occupied.

An encoding method of screen frame adaptively changing the image quality comprising: obtaining the screen frame; identifying at least one motion region and at least one motionless region within the screen frame; determining at least one motion encoding region covering the motion region; deciding a motion image quality, and encoding the motion encoding region; adding the motion encoding region into a historical list; determining at least one motionless encoding region covering the motionless region, wherein the motionless region is identified from the motion encoding region in the historical list; and deciding a motionless image quality and encoding the motionless encoding region, wherein the motionless image quality is better than the motion image quality.

An electronic device for transmitting screen frames of adaptively changed image quality comprising a processor unit executing a transmission method of screen frame for displaying the screen frame on a receiving end, wherein the transmission method comprises: obtaining the screen frame; identifying at least one motion region; determining at least one motion encoding region covering the motion region within the screen frame; deciding a motion image quality, and encoding and transmitting the motion encoding region; adding the motion encoding region into a historical list: identifying at least one motionless region in the motion encoding region, wherein the motionless region is identified from the motion encoding region in the historical list; determining at least one motionless encoding region covering the motionless region; and deciding a motionless image quality and encoding and transmitting the motionless encoding region, wherein the motionless image quality is better than the motion image quality.

The objective, technologies, features and advantages of the present invention will become more apparent from the following description in conjunction with the accompanying drawings, wherein certain embodiments of the present invention are set forth by way of illustration and examples.

DESCRIPTION OF THE PREFERRED EMBODIMENT

The detailed explanation of the present invention is described as follows. The described preferred embodiments are presented for purposes of illustrations and description, and are not intended to limit the scope of the present invention.

Figure 1:
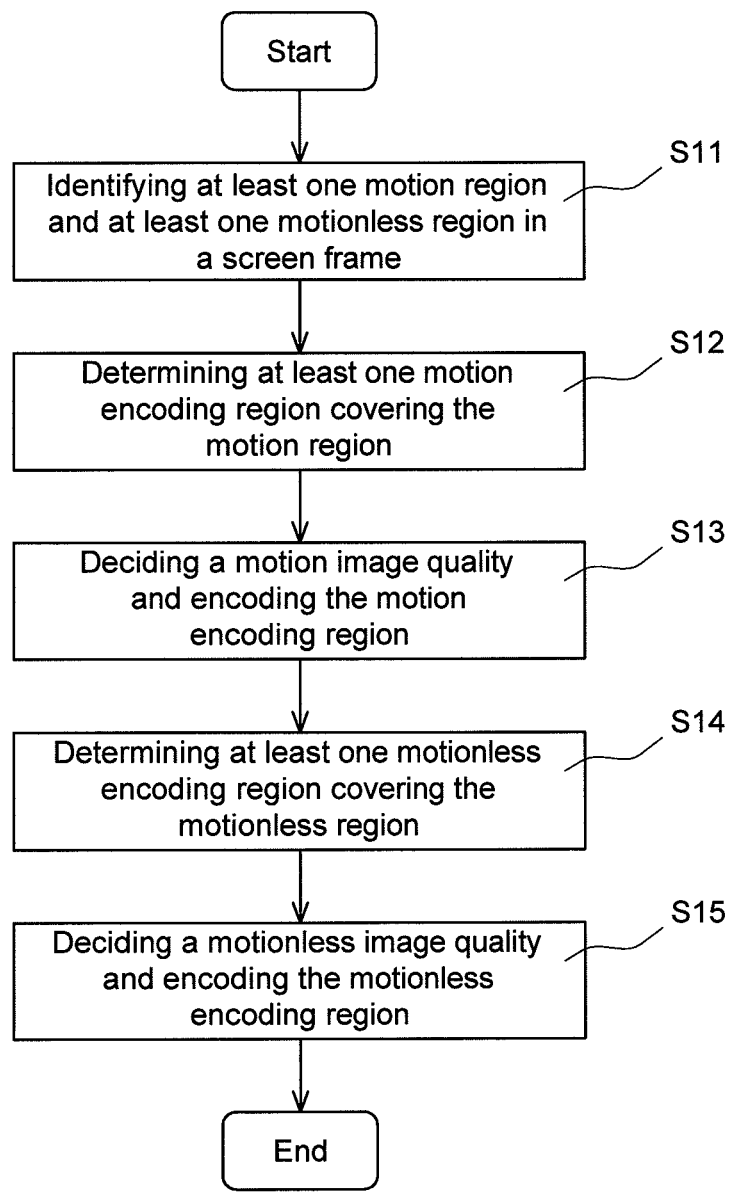
FIG. 1 is a flow chart schematically illustrating the steps of the encoding method of the screen frame according to one embodiment of the present invention.
Figure 2A:
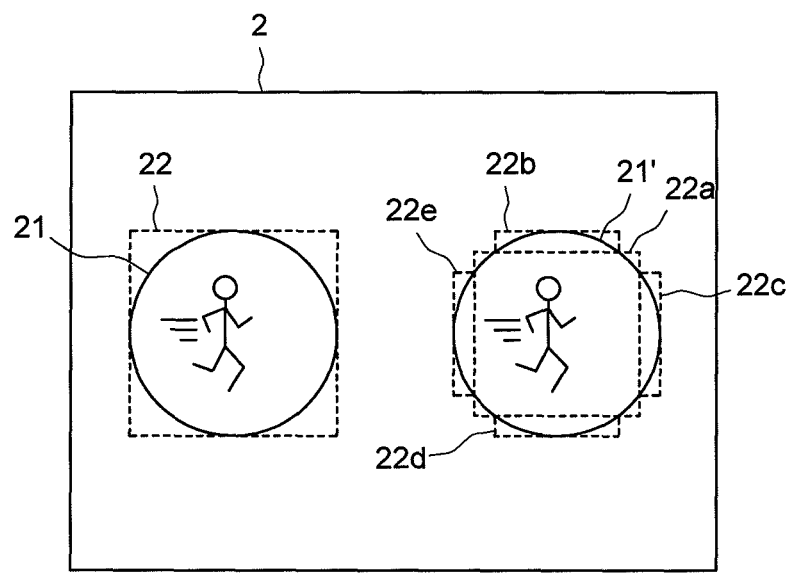
FIG. 2a and FIG. 2b are schematic diagrams illustrating the encoding method of the screen frame according to one embodiment of the present invention.

According to an embodiment in reference to FIG. 1 and FIG. 2a, the encoding method of screen frame adaptively changing the image quality includes the following steps. First, at least one motion region 21, 21' and at least one motionless region of a screen frame 2 are identified (S11). According to an embodiment, motionless region is the region of the screen frame 2 outside the motion regions 21, 21'. It is noted that a screen frame may include a plurality of motion regions and motionless regions. According to an embodiment, the motion region is obtained from comparing the difference between each pixel of the screen frame at two given time periods. For example, by performing an XOR operation on each corresponding pixels of two consecutive screen frames, the motion region of the later screen frame is identified.

Then, at least one motion encoding region covering the motion region identified in step S11 is determined (S12). As illustrated in FIG. 2a, the motion region 21 is covered by the motion encoding region 22. According to an embodiment, the motion encoding region is rectangular. It is noted that a single motion encoding region can cover but not limited to a plurality of motion regions. A single motion region can also be covered by a plurality of motion encoding regions. As illustrated in FIG. 2a, the motion region 21' is covered by the motion encoding regions 22a, 22b, 22c, 22d and 22e. In other words, the motion encoding region may cover a portion of the motion region or a plurality of motion regions.

Next, a motion image quality is decided, and the motion encoding regions 22, and 22a~22e are encoded based on the motion image quality. According to an embodiment, the size of the motion encoding region is one of the deciding factors of the motion image quality. For example, the motion image quality may be inversely proportional to the size of the motion encoding region; i.e. the larger the motion encoding region, the lower the motion image quality selected for encoding. Besides, different image qualities can be respectively selected for the plurality of motion encoding regions.

Referring still to FIG. 1, at least one motionless encoding region covering the motionless region is determined (S14). By the same token, the motionless region may be rectangular, and a single motionless encoding region can cover a plurality of motionless regions, or a single motionless region can be covered by a plurality of motionless encoding regions. Next, a motionless image quality is decided and the motionless encoding region is encoded based on the motionless image quality (S15). It is noted that the motionless image quality is better than the motion image quality. In short, the encoding method of the screen frame changes the image quality adaptively, wherein the motion region of the screen frame is encoded at a lower image quality and the motionless region of the screen frame is encoded at a higher image quality. According to an embodiment, the motionless image quality can be but not limited to be lossless, so as to fully present the regular patterns in the screen frame.

With the screen encoder repeating the steps to process the screen frames in series, the video region of the screen frames can be played smoothly while the motionless region is displayed at a better image quality. The encoding method of the present invention has not employed the complicated algorithms, such as motion estimation and motion compensation, etc., and hence occupies less system resources and has a shorter latency.

Figure 2B:
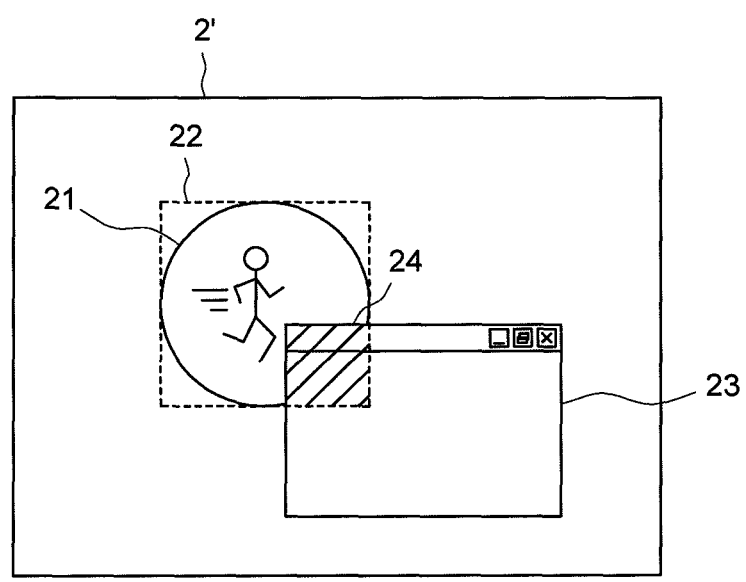
Figure 3:
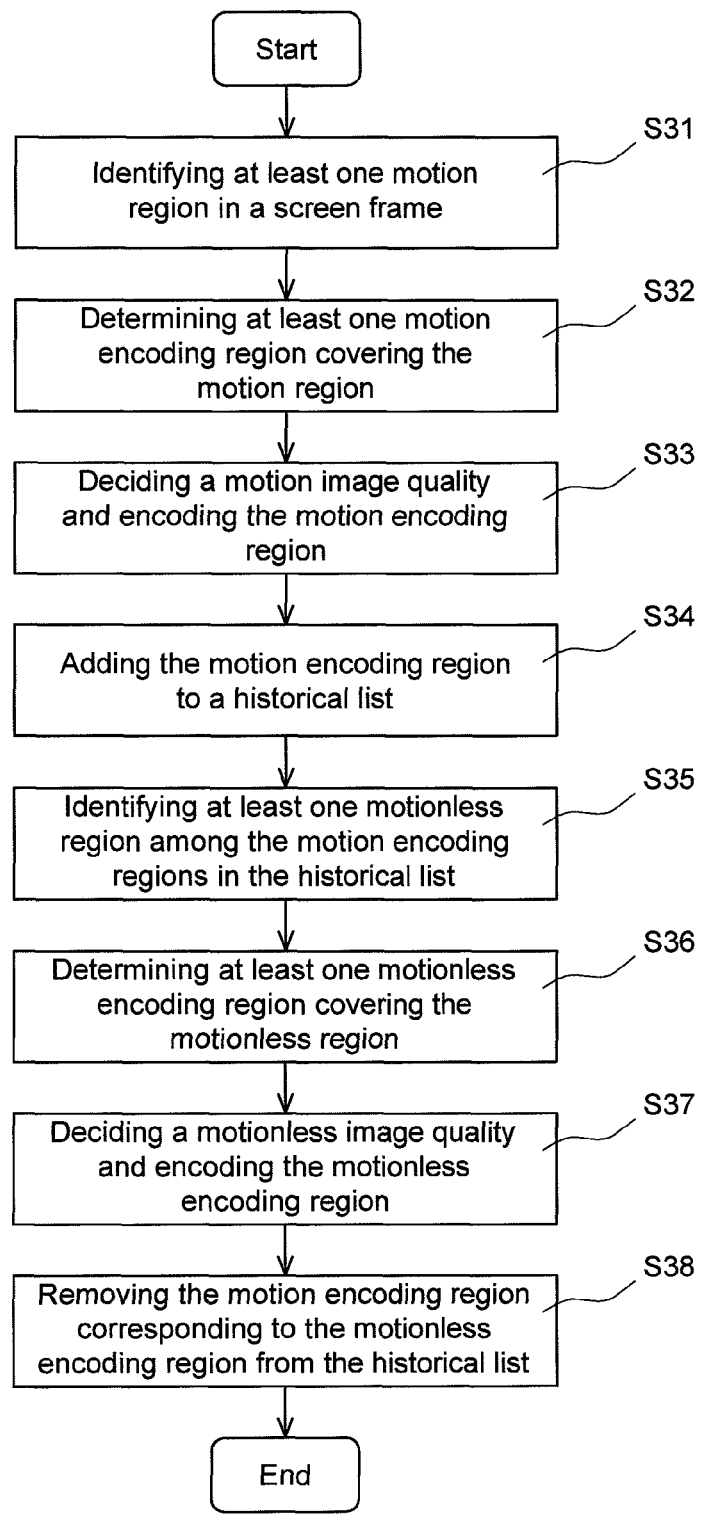
FIG. 3 is a flow chart schematically illustrating the steps of the encoding method of the screen frame according to another embodiment of the present invention.

According to another embodiment in reference to FIG. 3 and FIG. 2b, the encoding method of screen frame changing the image quality adaptively includes the following steps. First, at least one motion region 21 in the screen frame 2' (S31) is identified; then at least one motion encoding region 22 covering the motion region 21 is determined (S32); then a motion image quality is decided, and the motion encoding region is encoded based on the motion image quality (S33). The detail description of the steps has been provided above and would be skipped here.

Continued from the above description, the encoding method of the screen frame further includes the following steps. To begin with, the motion encoding region is added to a historical list (S34). Then, at least one motionless region is identified from the motion encoding regions in the historical list (S35). For example, the motion encoding region 22 may be added together with a time stamp into the historical list. This way, after a certain time periods, part of the motion encoding region or the entire motion encoding region that has not changed can be identified as the motionless region. As illustrated in FIG. 2b, the window 23, which includes a motionless content, overlaps partially with the motion encoding region 22. After a certain time period, the shaded overlap region is regarded as a motionless region 24.

Then, at least one motionless encoding region covering the motionless region 24 is determined (S36). In this embodiment, the motionless encoding region is equivalent to the motionless region 24. Then, a motionless image quality is decided and the motionless encoding region is encoded based on the motionless image quality (S37), wherein the motionless image quality is better than the motion image quality. Finally, the motion encoding region corresponding to the motionless encoding region is removed from the historical list (S38). As illustrated in FIG. 2b, according to an embodiment, the motion encoding region 22 and the motionless encoding region are nonoverlapping regions so as to avoid duplicate operations on the overlapping regions.

Figure 4:
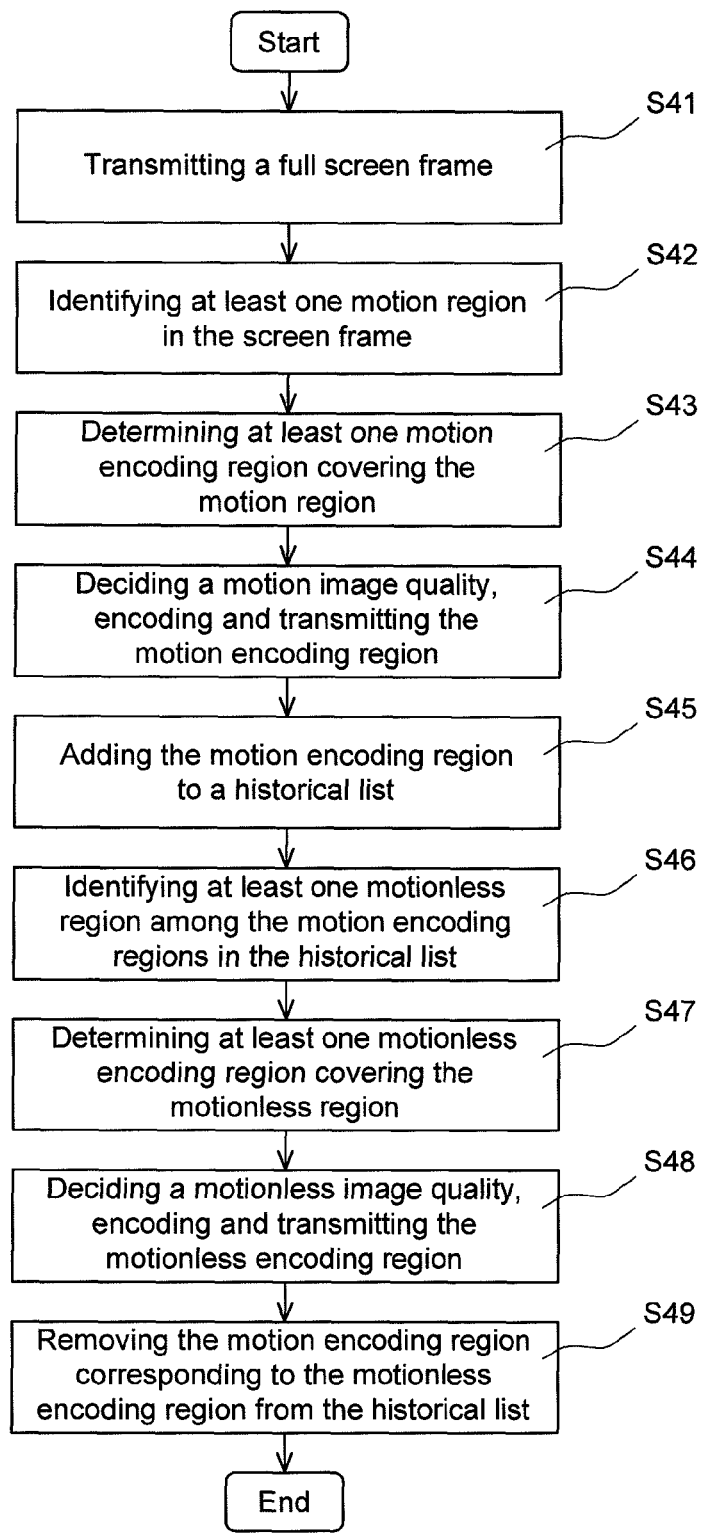
FIG. 4 is a flow chart schematically illustrating steps of the transmission method executed by the electronic device according to one embodiment of the present invention.

According to an embodiment in reference to FIG. 4, an electronic device applies the encoding method of screen frame to the transmission of screen frames with adaptively changed image quality. The electronic device includes a processor unit executing a transmission method of the screen frame so that the receiving end can display the screen frame transmitted by the electronic device. According to different embodiments, the electronic device can transmit the screen frame through wired or wireless communication. The transmission method includes: identifying at least one motion region (S42); determining at least one motion encoding region covering the motion region (S43); deciding a motion image quality, encoding and transmitting the motion encoding region (S44); identifying at least one motionless region in the motion encoding region (S46); determining at least one motionless encoding region covering the motionless region (S47); and deciding a motionless image quality, encoding and transmitting the motionless encoding region (S48), wherein the motionless image quality is better than the motion image quality. The detail description of the steps has been provided above and would be skipped here.

According to an embodiment, the transmission method further includes a step of adding the motion encoding region to a historical list (S45) after the motion encoding region is transmitted. Then, the motionless region is identified from the motion encoding regions in the historical list in step S46. Besides, after the motionless encoding region is encoded and transmitted, the motion encoding region corresponding to the motionless encoding region is removed from the historical list (S49).

According to an embodiment still in reference to FIG. 4, the electronic device can transmit a full screen frame initially (S41). Thereafter, the electronic device can transmit only the motion encoding region and the motionless encoding region required to be updated with steps S42~S49. The receiving end would receive the initial full screen frame and the subsequent motion encoding regions and motionless encoding regions to reconstruct the screen frame. For example, suppose the window 23 in FIG. 2b is under the motion encoding region 22 originally. After the full screen frame 2' is transmitted, only the motion encoding region 22 including the video is required to be transmitted subsequently. When the window 23 is moved to be on top of the motion encoding region, only the shaded motionless region 24 is updated with respect to the screen frame 2'. Therefore, the transmitting end only needs to transmit the motionless encoding region and the motion encoding region 22 that is not covered by the window 23 for reconstructing the screen frame.

To summarize the foregoing descriptions, the encoding method of the screen frame and the electronic device applying the same encode the motion region of the screen frame at a lower image quality so that a smooth video is presented on the receiving end, and encode the motionless region of the screen frame at a higher image quality so that a higher quality motionless image is presented simultaneously. Besides, the encoding method of the screen frame of the present invention has not employed the complicated algorithms of motion estimation and motion compensation and therefore requires less system resources, avoids affecting other jobs of the user when running as a background, and is more suitable for real time applications due to lower latency.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. An encoding method of screen frame adaptively changing the image quality, comprising:
    obtaining the screen frame:
    identifying at least one motion region and at least one motionless region within the screen frame;
    determining at least one motion encoding region covering the motion region;
    deciding a motion image quality, and encoding the motion encoding region;
    adding the motion encoding region into a historical list:
    determining at least one motionless encoding region covering the motionless region, wherein the motionless region is identified from the motion encoding region in the historical list; and
    deciding a motionless image quality and encoding the motionless encoding region, wherein the motionless image quality is better than the motion image quality.

2. The encoding method of screen frame adaptively changing the image quality according to claim 1, wherein the motion encoding region is added together with a time stamp into the historical list.

3. The encoding method of screen frame adaptively changing the image quality according to claim 1, further comprising:
    removing the motion encoding region corresponding to the motionless region from the historical list.

4. The encoding method of screen frame adaptively changing the image quality according to claim 1, wherein the motion region is obtained from comparing the difference between each pixel of the screen frame at two given time periods.

5. The encoding method of screen frame adaptively changing the image quality according to claim 1, wherein the motion encoding region covers a portion of the motion region, or a plurality of motion regions.

6. The encoding method of screen frame adaptively changing the image quality according to claim 1, wherein the motionless encoding region covers a portion of the motionless region, or a plurality of motionless regions.

7. The encoding method of screen frame adaptively changing the image quality according to claim 1, wherein the motion image quality is inversely proportional to the size of the motion encoding region.

8. The encoding method of screen frame adaptively changing the image quality according to claim 1, wherein the motionless image quality is lossless.

9. The encoding method of screen frame adaptively changing the image quality according to claim 1, wherein the motion encoding region and/or the motionless encoding region is rectangular.

10. An electronic device for transmitting screen frames of adaptively changed image quality, comprising:
    a processor unit executing a transmission method of the screen frame for displaying the screen frame on a receiving end, wherein the transmission method comprises:
    obtaining the screen frame;
    identifying at least one motion region within the screen frame;
    determining at least one motion encoding region covering the motion region;
    deciding a motion image quality, and encoding and transmitting the motion encoding region;
    adding the motion encoding region into a historical list;
    identifying at least one motionless region in the motion encoding region, wherein the motionless region is identified from the motion encoding regions in the historical list;
    determining at least one motionless encoding region covering the motionless region; and
    deciding a motionless image quality and encoding and transmitting the motionless encoding region, wherein the motionless image quality is better than the motion image quality.

11. The electronic device according to claim 10, wherein the transmission method further comprises:
    transmitting a full screen frame.

12. The electronic device according to claim 10, wherein the motion encoding region is added together with a time stamp into the historical list.

13. The electronic device according to claim 10, wherein the transmission method further comprises:
    removing the motion encoding region corresponding to the motionless region from the historical list.

14. The electronic device according to claim 10, wherein the motion region is obtained from comparing the difference between each pixel of the screen frame at two given time periods.

15. The electronic device according to claim 10, the motion encoding region covers a portion of the motion region, or a plurality of motion regions.

16. The electronic device according to claim 10, the motionless encoding region covers a portion of the motionless region, or a plurality of motionless regions.

17. The electronic device according to claim 10, wherein the motion image quality is inversely proportional to the size of the motion encoding region.

18. The electronic device according to claim 10, wherein the motionless image quality is lossless.

19. The electronic device according to claim 10, wherein the motion encoding region and/or the motionless encoding region is rectangular.

20. The electronic device according to claim 10 transmitting the screen frame to the receiving end through wired or wireless communication.

* * * * *